July 8, 1958 — I. ZOLTÁN — 2,842,737
CONTINUOUS THICKNESS GAUGE FOR FERROMAGNETIC MATERIALS
Filed Feb. 28, 1955 — 7 Sheets-Sheet 1
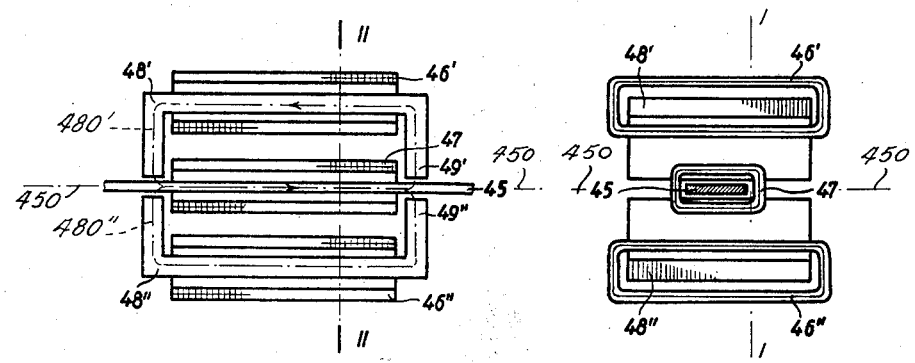
Fig. 1  Fig. 2
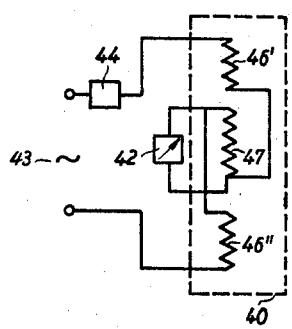 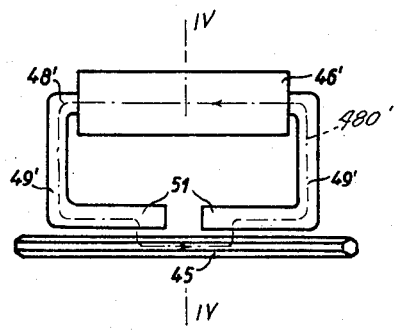
Fig. 3  Fig. 5
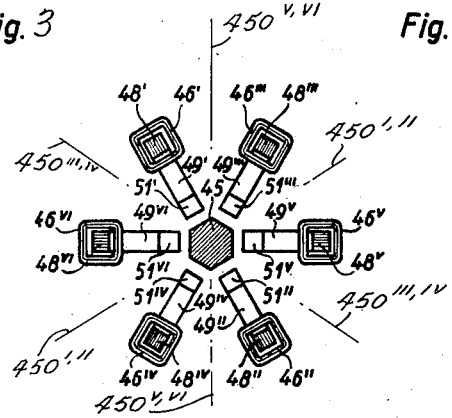
Fig. 4
INVENTOR.
ISTVAN ZOLTAN
BY Mock & Blum
ATTORNEYS INVENTOR.
ISTVAN ZOLTAN
BY Mock & Blum
ATTORNEYS July 8, 1958           I. ZOLTÁN           2,842,737

CONTINUOUS THICKNESS GAUGE FOR FERROMAGNETIC MATERIALS

Filed Feb. 28, 1955           7 Sheets-Sheet 3

INVENTOR.
ISTVAN ZOLTAN

BY Mock & Blum

ATTORNEYS

July 8, 1958 — I. ZOLTÁN — 2,842,737
CONTINUOUS THICKNESS GAUGE FOR FERROMAGNETIC MATERIALS
Filed Feb. 28, 1955 — 7 Sheets-Sheet 4

INVENTOR.
ISTVAN ZOLTAN
BY
ATTORNEYS

July 8, 1958     I. ZOLTAN     2,842,737
CONTINUOUS THICKNESS GAUGE FOR FERROMAGNETIC MATERIALS
Filed Feb. 28, 1955     7 Sheets-Sheet 5

INVENTOR.
ISTVAN ZOLTAN
BY Mock + Bluem
ATTORNEYS

July 8, 1958  I. ZOLTÁN  2,842,737
CONTINUOUS THICKNESS GAUGE FOR FERROMAGNETIC MATERIALS
Filed Feb. 28, 1955  7 Sheets-Sheet 6

INVENTOR.
ISTVAN ZOLTAN
BY Mock & Blum
ATTORNEYS

July 8, 1958          I. ZOLTÁN          2,842,737

CONTINUOUS THICKNESS GAUGE FOR FERROMAGNETIC MATERIALS

Filed Feb. 28, 1955          7 Sheets-Sheet 7

INVENTOR.
ISTVAN ZOLTAN
BY
*Mock & Blum*
ATTORNEYS

United States Patent Office 2,842,737
Patented July 8, 1958

2,842,737
CONTINUOUS THICKNESS GAUGE FOR FERROMAGNETIC MATERIALS

István Zoltán, Budapest, Hungary, assignor to Villamosipari Kozponti Kutato Laboratorium, Budapest, Hungary, a Hungarian research institute Application February 28, 1955, Serial No. 490,876

Claims priority, application Hungary February 27, 1954

15 Claims. (Cl. 324—34)

This invention relates to an electromagnetic method of, and apparatus for, gauging, preferably continuously, cross-sectional areas of ferromagnetic materials, particularly the thickness of ferromagnetic sheets or laminae.

The hitherto known devices of the above type operate on various working principles. According to one of the known suggestions, the test material is contacted with a gauge so as to alter its impedance from the alterations of which an electric signal related to the thickness of the test material is indirectly derived. The operation of such devices, however, depends on a proper magnetic coupling between gauge and test material, and neither are, therefore, suitable for continuous gauging. Other gauges work with a unidirectional magnetic flux substantially saturating the test material when the latter is positioned or passed in the proximity thereof. The desired electric signal is derived either by comparing the magnetomotive force stored in the test material and in a reference piece by means of a ballistic galvanometer, or from an additional alternating magnetic flux localized in the gauge proper and superimposed on the unidirectional flux which traverses also the test material. With such gauges, the test material is positioned unilaterally with respect to the gauge and, therefore, gauging is influenced by the degree of homogeneity of the magnetic field in the measuring region. Moreover, the test material may stay in magnetized condition after the measuring operation has been carried out. Other proposals suggest the use of superimposed A. C., magnetic fluxes which traverse also the test materials. Such arrangements, however, aim at locating defects in magnetic articles such as tubes or the like by means of phase shifts rather than at measuring the absolute magnitude of cross-sectional areas or at gauging ferromagnetic materials of other than circular cross-sections or the like.

The main object of the present invention is to provide an improved gauge of the above described type which is particularly suitable for the continuous and direct gauging by warranting the homogeneity of the magnetic field in the measuring region and by eliminating measuring errors eventually caused by mutual transverse displacements of the gauge and the test material, and which does not bias the gauged material. According to the basic idea of the invention this is attained by applying a measuring unit comprising at least one pair of open magnetic circuits arranged symmetrically with respect to a common reference plane which faces their open portions. Furthermore, it comprises path means for passing a ferromagnetic material to be gauged as test material along said common reference plane so as to occupy positions, wherein it is adapted to conduct magnetic fluxes energized in said open magnetic circuits across the open portions thereof. The measuring unit is provided also with first electric means for producing mutually opposed alternating magnetic fluxes in said open magnetic circuits or alternating magnetic fields in the open portions thereof of sufficient value substantially to saturate said test material, and with second electric means responsive to variations in the magnitude of said alternating magnetic fluxes due to variations in the cross-sectional areas of said test material.

By the symmetric arrangement of the open magnetic circuits, on one hand, transverse movements of the passing test material are compensated as regards the common action of the magnetic fluxes and also a highly homogeneous magnetic field is obtained in the region where the test material links with the flux, i. e., in the open portions of the magnetic circuits. On the other hand, the alternating magnetic flux traversing the test material permits to easily derive an electric signal which is directly characteristic of the cross-sectional area to be gauged and warrants the unaltered magnetic condition of the test material when it is removed from the gauge according to the invention.

It is known that the advantage of applying saturating fluxes is that fluctuations of the magnetizing current do not seriously influence the measuring results. Otherwise, the effects of such fluctuations have to be compensated, e. g. by means of balancing circuits, or the constancy of the magnetizing current has to be provided for. If, on the other hand, an error caused by the magnetic inhomogeneity of the test material lies within admitted error limits, the fluxes used need not be of saturating values. In such cases, however, the magnetizing current has to be stabilized, e. g. by means of a barretter.

In order to have the induction rendered evenly distributed across the gauged cross-sectional area of the material, the frequency of the alternating magnetic field has to be selected in dependence on the size and form of the cross-sectional area and, in case of continuous gauging, on the passing velocity of the test material. When gauging materials of reduced thickness such as transformer and dynamo sheets of usual thickness at a relatively low passing velocity good results may be obtained by means of alternating magnetic fields of standard mains frequencies. If materials of relatively big cross-sectional areas or thickness are to be gauged, the frequency may be selected so as to be lower than the standard mains frequencies. Preferably, the frequency should not alter within the required limits of measuring accuracy since the magnitude of the electric signal to be indicated alters proportionally to the frequency of the alternating magnetic field. Otherwise, the errors arising from frequency fluctuations have to be decreased so as to remain below the practically required limits.

As to further details, reference is made to the accompanying drawings which show, by way of example, several embodiments of the new apparatus or gauge. In the drawings:

Fig. 1 illustrates a longitudinal sectional view of an embodiment of the invention taken along the line I—I of Fig. 2.

Fig. 2 represents a cross-sectional view taken along the line II—II of Fig. 2.

Fig. 3 shows the circuit diagram of the embodiment illustrated in Figs. 1 and 2.

Fig. 4 is the cross-sectional view of another embodiment taken along the line IV—IV of Fig. 5.

Fig. 5 illustrates a side elevational view of a detail of the embodiment shown in Fig. 4.

Figure 6:
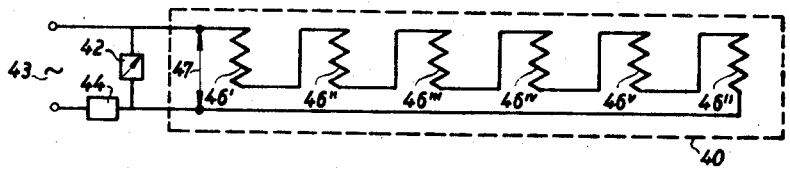
Fig. 6 is the circuit diagram of the embodiment illustrated in Figs. 4 and 5.

Same reference numerals refer to like details throughout the drawings. If details are of like character yet their arrangement is of the mirror-image type, the reference numerals are primed. If details are of like character and similar arrangement, the distinguishing sign is a subscript. Electromagnetically analogous elements connected in bucking relation are distinguished by an index "a" added to the reference numeral proper.

Referring to the drawings, reference numeral 40 designates a measuring system or unit, reference numeral 41 indicates a path means for passing ferromagnetic materials to be gauged through the measuring unit 40, reference numeral 42 denotes an indicator means for indicating an electric signal received from the measuring unit 40, and reference numeral 43 refers to an A. C. current source eventually connected in series with a regulating means 44. The ferromagnetic material to be gauged and passed as test material through the measuring unit 40 is referred to by reference numeral 45.

The regulating means 44 serves for decreasing possible alterations of the magnetizing current caused by measuring and may consist e. g. of a high impedance inserted into the current source 43 or of a current stabilizer organ whatever, e. g. a barretter such as an iron filament lamp known per se or the like.

The measuring unit 40 comprises at least one pair of open magnetic circuits arranged symmetrically with respect to a common reference plane 450 which is defined by a plane of symmetry of the test material 45 and which faces the open portions of the magnetic circuits as is obvious from Figs. 1, 4, 10, 13, 18 and 22. Furthermore, it comprises first electric or electromagnetic means for producing mutually opposed alternating magnetic fluxes in the open magnetic circuits of sufficient value substantially to saturate the test material 45, and second electric means responsive to variation in the magnitude of the alternating magnetic fluxes due to variations in the cross-sectional area of the test material 45.

With the represented embodiment shown in Figs. 1 to 3, the first electric means consists of magnetizing coil means 46' and 46" arranged along the open magnetic circuits and supported by yoke means 48' and 48" which are made of magnetic material and define the spacial arrangement of the open magnetic circuits. The latter are indicated by dot-dash lines 480' and 480", respectively.

The second electric means consists of a measuring coil means 47 arranged likewise along the open magnetic circuits in the open portions thereof which are confined by leg portions 49' and 49" of the yoke means 48' and 48", respectively.

The breadth of the yoke means 48' and 48" is greater than that of the material 45 of oblong cross-sectional area so that the latter passes through a homogeneous region of the alternating magnetic field delimited by the yoke means 48' and 48". The magnetizing coil portions are selected so that the magnetic reluctance of the magnetic circuits outside of the material to be gauged such as air gaps and the yoke means proper which serve for reconducting the magnetic flux induced in the test material be rendered practically negligible as far as the measuring coil means is concerned. In such cases this measuring coil means may be deemed as a solenoid of infinite length with a homogeneous field.

Obviously, with the represented embodiment the magnetizing coil means and the measuring coil means form a system of connected coil means, the magnetizing coil portions 46' and 46" of which are arranged on the yoke means 48' and 48", respectively, whereas the measuring coil portion 47 surrounds the path of the test material 45. The circuit diagram illustrated in Fig. 3 shows that the magnetizing coil portions 46' and 46" are connected so that the fluxes generated in their associated yoke means 48' and 48", i. e. the open magnetic circuits, become closed through the test material 45. Such a symmetrical arrangement has the considerable advantage that the effect of air gap alterations caused by eventual corrugation of the material 45 to be gauged is rendered automatically compensated as has been hinted at in the preamble of the specification.

In case of elongated bodies such as materials of polygonal or circular cross-section which are difficult to magnetize the yoke means will preferably have a radial arrangement. When gauging a material of hexagonal cross-section the yoke means may be arranged e. g. as shown in the Figs. 4 to 6. With this embodiment there are yoke means 48', 48", 48$^{III}$, 48$^{IV}$, 48$^{V}$, 48$^{VI}$ radially arranged each along one of the lateral faces of the test material 45 of hexagonal cross-section, the magnetizing coil means being subdivided according to the number of the yoke means into six magnetizing coil portions 46', 46", 46$^{III}$, 46$^{IV}$, 46$^{V}$, 46$^{VI}$, respectively. In order to increase the field strength of the homogeneous alternating magnetic field by means of reducing the length of the flux lines it is preferable to provide the leg portions 49', 49", 49$^{III}$, 49$^{IV}$, 49$^{V}$, 49$^{VI}$ of the yoke means 48', 48", 48$^{III}$, 48$^{IV}$, 48$^{V}$, 48$^{VI}$ with extensions 51', 51", 51$^{III}$, 51$^{IV}$, 51$^{V}$, 51$^{VI}$, respectively, so as to reduce the distance therebetween as is particularly illustrated in Fig. 5. With the represented embodiment the measuring coil portion 47 is jointly formed by the magnetizing coil portions 46', 46", 46$^{III}$, 46$^{IV}$, 46$^{V}$, 46$^{VI}$, as is obvious from the circuit diagram shown in Fig. 6. Furthermore, this embodiment is distinguished from the previous one in that the whole system of magnetizing coil means is arranged on the yoke means.

The above described embodiments are generally used for gauging relatively narrow materials. In case of broader strip or sheet materials, however, such arrangements would result in eventually oversized apparatus. Instead a measuring unit will be applied which is narrower than the test material. In order to eliminate the transverse magnetic leakage from the measurement, a pair of main or first open magnetic circuits may have on both sides thereof and in parallel therewith auxiliary or second open magnetic circuits which are then arranged in a transverse direction with respect to the direction of the magnetic flux lines. The second electric means are connected to the medial main or first pair of open magnetic circuits so as to increase the homogeneity of the alternating magnetic fields in the gauging region of the measuring coil means. This arrangement constitutes a counterpart of the guard-ring arrangements well known in the electric measuring techniques.

Figure 7:
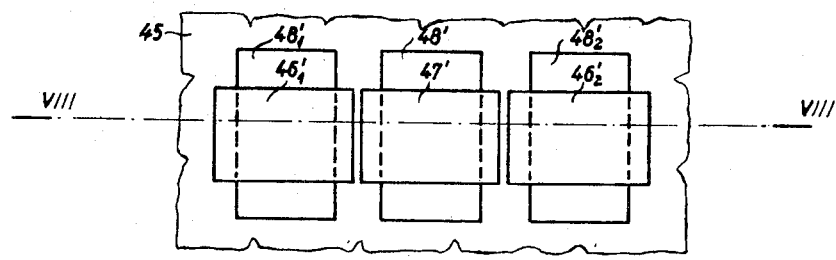
Fig. 7 represents the plain view of a still further embodiment.
Figure 8:
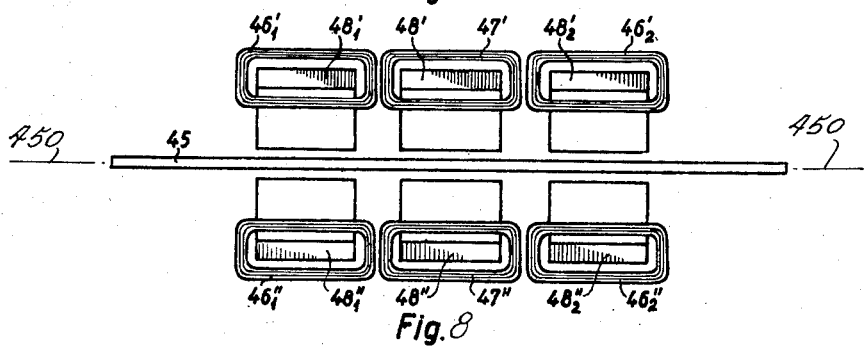
Fig. 8 shows longitudinal sectional view taken along the line XIV—XIV of Fig. 7.
Figure 9:
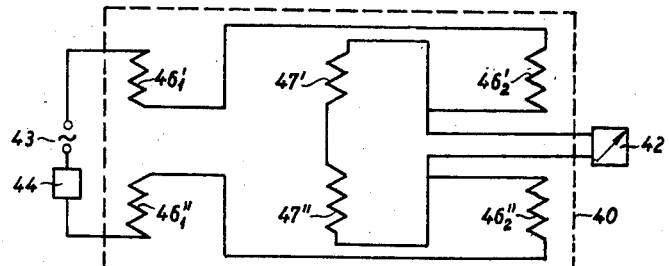
Fig. 9 is the circuit diagram of the embodiment illustrated in Figs. 7 and 8.

Such an embodiment is represented in Figs. 7 to 9. Here medial main or first yoke means 48' and 48" symmetrically arranged on opposite sides of the test material 45 have each further auxiliary or second yoke means 48'₁, 48'₂ and 48"₁, 48"₂, respectively, arranged on both sides thereof. The second electric means for deriving the electric signal are arranged on the medial yoke means 48' and 48" in form of measuring coil portions 47' and 47", respectively, which serve, at the same time, for magnetizing the latter. The magnetizing coil portions of the lateral yoke means 48'₁, 48'₂ and 48"₁, 48"₂ are referred to by reference numerals 46'₁, 46'₂ and 46"₁, 46"₂, respectively. The lateral yoke means and their magnetizing coil portions are destined to confine the flux linking with the test material and induced by the coil portions of the medial yoke means to the breadth of the medial yoke means in compliance with what has been said above. The number of turns of the magnetizing coil portions of the lateral yoke means will be selected accordingly. If needed, this number of turns may be different from, e. g. greater than the number of turns of the magnetizing coil portions of the medial yoke means.

In case of relatively broader materials a plurality of such measuring units 40 may be applied simultaneously whereby a stripwise measurement of the thickness of the test material 45 is rendered possible. Arranging the measuring units 40 in a suitable manner, the average value of the individual measuring results will be characteristic of the average thickness of the material.

With the previously described embodiments, the electric signal has been derived by means of a measuring coil means which was connected to the system of the magnetizing coil means. The measuring coil means, however, may also be galvanically separated from the system of magnetizing coil means. The advantage of such an arrangement is that the requirements as to matching between the magnetizing coil means and the current source as well as between the measuring unit and the indicator means, respectively, may be met with independently of one another. Moreover, the voltage drop arising from the ohmic resistance of the magnetizing circuit of the first electric or electromagnetic means and the fluctuations thereof depending on the magnetizing current cannot entail measuring errors. Furthermore, since the magnetizing current does not flow through the measuring coil means, the size of the latter may be selected so as to be smaller than the size of a measuring coil means forming a portion of the system of magnetizing coil means otherwise utilized for measuring. Consequently, the flux induced in the test material can be measured at linking with less additional flux. Thus, the reliability of the measurement is, under otherwise identic conditions, relatively higher.

When simultaneously using a plurality of measuring units for ascertaining the average thickness of relatively broader materials, the measuring coil means being independent of the magnetizing circuit have the advantage of being able to be connected in series for deriving the electric signal characteristic of the average thickness, in contradistinction to arrangements which have no galvanically separated measuring coil means and derive the electric signal characteristic of the thickness each from a portion of the system of magnetizing coil means. Obviously, these coil portions utilized for measuring cannot be directly connected in series. Galvanically separated measuring coil means, however, could also be applied with any of the previously described embodiments. For this purpose but an individual coil has to be arranged within the measuring coil portion 47 of the magnetizing coil means 46 and the indicator means 42 has to be connected to this particular coil.

Figures 10, 11:
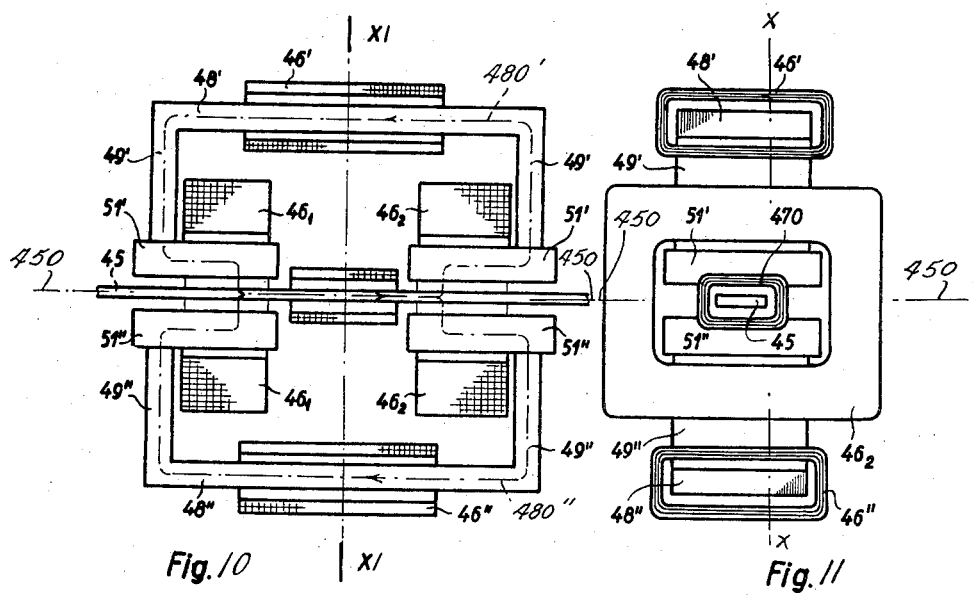
Fig. 10 is a longitudinal sectional view of a still further embodiment taken along the line X—X of Fig. 11.
Fig. 11 illustrates a cross-sectional view taken along the line XI—XI of Fig. 10.
Figure 12:
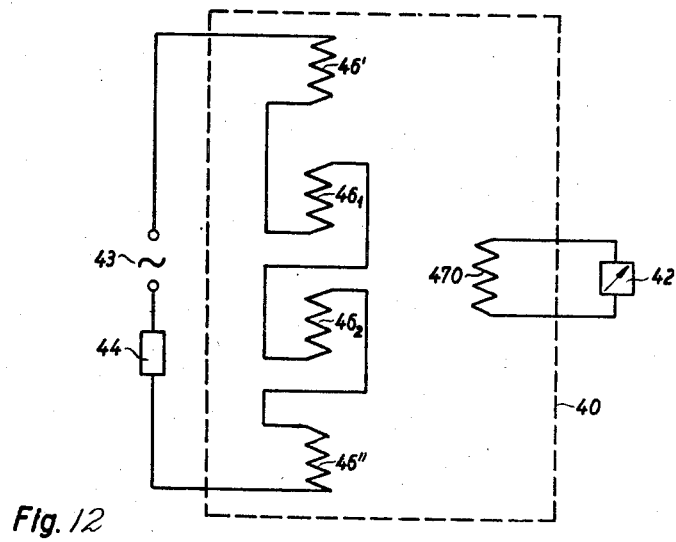
Fig. 12 represents the circuit diagram of the embodiment shown in Figs. 10 and 11.

An embodiment with a measuring coil is illustrated in Figs. 10 to 12. This embodiment corresponds principally to a combination of the embodiments shown in Figs. 1 to 3 and 4 to 6, respectively. It is distinguished from both in that the indicator means 42 is, instead of the measuring coil portion 47, connected to an individual measuring coil means 470 galvanically separated from the magnetizing circuit. Furthermore, it is distinguished from the embodiments shown in Figs. 1 to 3 in that the leg portions 49' and 49" of the yoke means 48' and 48", respectively, is, similar to the embodiment represented in Figs. 4 to 6, provided with extensions 51' and 51", respectively. A further distinguishing feature with respect to the embodiment illustrated in Figs. 4 to 6 consists in that the test material 45 is surrounded by the measuring coil means 470 as was the case with the embodiment shown in Figs. 1 to 3, also the extensions 51' and 51" being magnetized by magnetizing coil portions 46₁ and 46₂, respectively, forming parts of the magnetizing coil means 46.

Figures 13, 15:
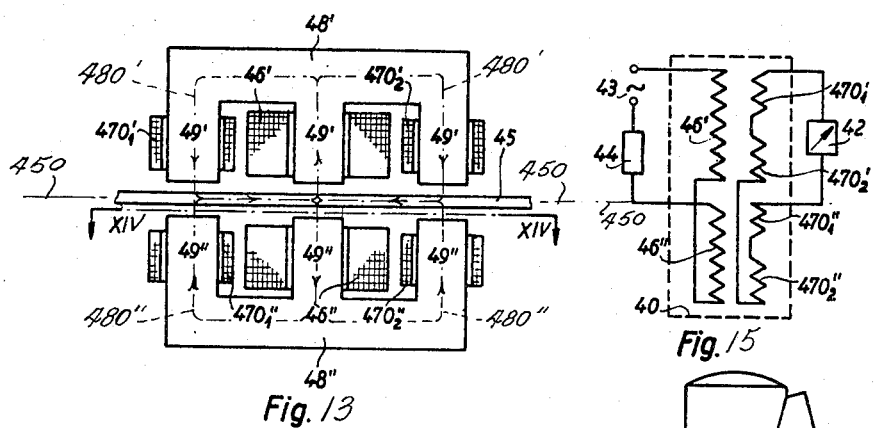
Fig. 13 is a longitudinal sectional view of a still further embodiment taken along the line XIII—XIII of Fig. 14.
Fig. 15 represents the circuit diagram of the embodiment shown in Figs. 13 and 14.
Figures 14, 24:
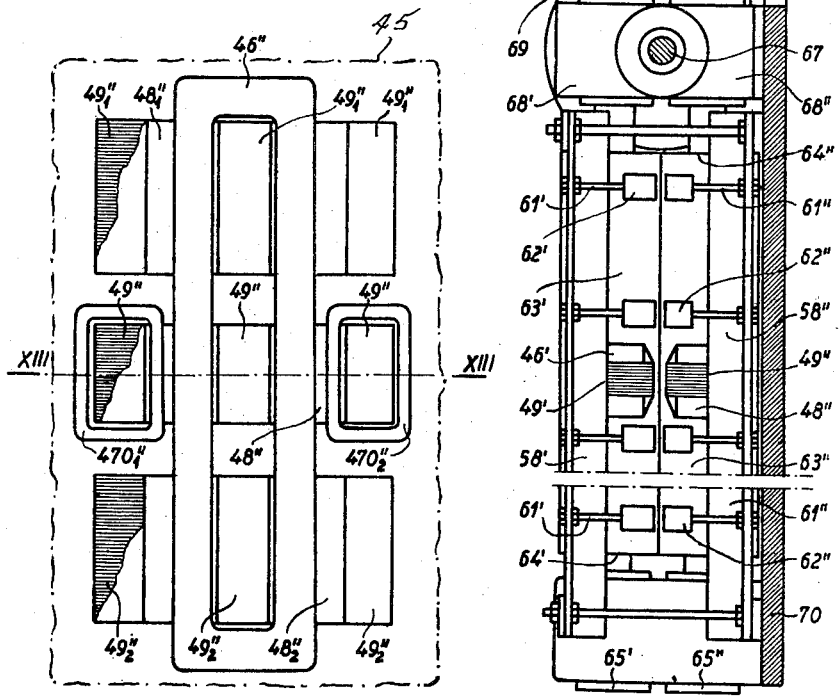
Fig. 14 illustrates a cross-sectional view taken along the line XIV—XIV of Fig. 13.
Fig. 24 shows a cross-sectional view taken along the line XXIV—XXIV of Fig. 23.

An embodiment likewise provided with a measuring coil means is represented in Figs. 13 to 15. This embodiment is similar to that shown in Figs. 7 to 9. However, instead of the previously described measuring coil portions 47' and 47" measuring coil means 470'₁, 470'₂, 470"₁, 470"₂ have been applied and arranged on the extreme leg portions 49' and 49" of E-shaped yoke means 48' and 48", respectively. The medial leg portions 49"₁, 49" and 49"₂ of all three yoke means 48"₁, 48" and 48"₂, respectively, are jointly magnetized by the magnetizing coil means 46". The medial leg portions of the upper yoke means as regards Fig. 13 are magnetized in a like manner. In order to further enhance the even distribution of the flux induced in the test material 45 in its portion delimited for measurement the magnetization of the lateral yoke means may be provided with additional magnetizing coil means as was the case with the embodiment shown in Figs. 7 to 9.

With the previously described embodiments the desired electric signal has been derived from the sum of the fluxes induced in the test material in its portion subjected to and of other fluxes additionally linking with the coil means utilized for gauging.

The fluxes outside of the test material being practically proportional to the intensity of the magnetizing current, a current stabilizer organ 44 has been applied with the aforesaid embodiments so as to keep the above mentioned external fluxes constant, their magnitude having been taken into consideration as a correction factor as regards the scale of the indicator means 42.

It is, however, possible to eliminate the fluxes proportional to the field strength of the alternating magnetic field and independent of the material to be gauged in that a first or main measuring system or unit of the above described type is associated with a second balancing or counter-measuring system or unit electrically connected to the first or main one, both systems or units being electromagnetically equivalent and mutually opposite so as to compensate magnetic fluxes which are independent of the test material.

Figure 16:
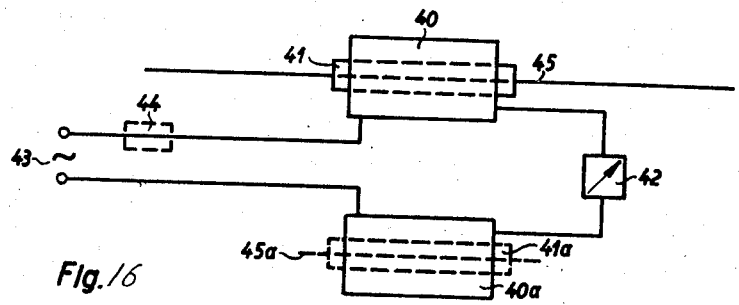
Figs. 16 and 17 are the circuit diagrams of two further embodiments, respectively.

The principle of arrangement of such an embodiment is illustrated in Fig. 16. In this case the measuring unit 40 as a first or main one has an electromagnetically equivalent second or counter-measuring unit 40a connected to it in bucking relation so that the action of the latter is opposite to that of the former as regards the linkings of fluxes. The indicator means is then connected across the first and second measuring units 40 and 40a. The electromagnetic characteristics of both measuring units 40 and 40a are selected so that the electric signal indicated by the indicator means 42 be zero, viz. the electric signals being derived from fluxes which are independent of the flux induced in the test material compensate one another if there is no material 45 to be gauged in the first measuring unit 40 and the intensity of the energizing current lies within the limits of the measuring range.

The basic principle of the present invention is, within the practically possible limits, best realized with such compensation embodiments since then the desired electric signal is derived exclusively from the intrinsic flux actually characteristic of the cross-sectional area of the test material, since the intrinsic flux proper is proportional to the intrinsic induction $B_i = B - H$ and to the cross-sectional area to be gauged. On the other hand, the intrinsic flux $B_i$ could be increased at most to the saturation value $B_s$ which, in turn, practically depends but on the composition of the material and with gauging materials of the same charge can be regarded as a constant value. Thus, if the intensity of the magnetizing current is in the course of gauging high enough to cause the induction induced in the test material to substantially approach the saturation value $B_s$, eventual fluctuations of the magnetizing current cannot entail measuring errors. In such cases a stabilization of the magnetizing current can be dispensed with.

If, however, the test material can be deemed suitably homogeneous from a magnetic point of view and too high magnetizations were needed for approaching the state of saturation, it is more preferable to keep the magnetizing current constant by the stabilizing means 44 wherefore the latter is illustrated in Fig. 16 by dotted lines.

If ascertaining the diversities of the cross-sectional area or thickness of the test material from a preselected value is mainly aimed at, the aforesaid second or counter-measuring unit may comprise second or counter-path means for positioning a reference piece made of the test material and having a standard cross-sectional area so as to additionally compensate magnetic fluxes energized in the test material in proportion to its standard cross-sectional area.

An embodiment realizing such a variant of the compensation principle is indicated in Fig. 16 by dotted lines showing a second or counter-path means 41a and a reference piece 45a made of the test material 45 which is accommodated within the counter-path means 41a and has a standard cross-sectional area.

Figure 17:
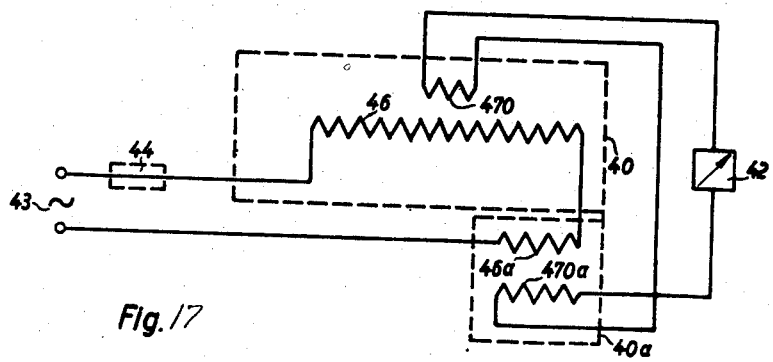

Fig. 17 shows a circuit arrangement adapted for practical realization of the compensation principle wherein no reference piece is applied and which is, therefore, adapted to gauge the absolute magnitude of the cross-sectional area of the material to be gauged. This embodiment is provided, on one hand, with a measuring coil 470 and, on the other hand, with a counter-measuring unit 40a consisting of a magnetizing coil means 46a and a counter-measuring coil 470a, the mutual inductance of which is equal to the mutual inductance of the magnetizing unit 46 and the measuring coil 470 of the measuring unit 40. Both measuring units 40 and 40a are connected to the indicator means 42 in bucking relation.

Figures 18, 19:
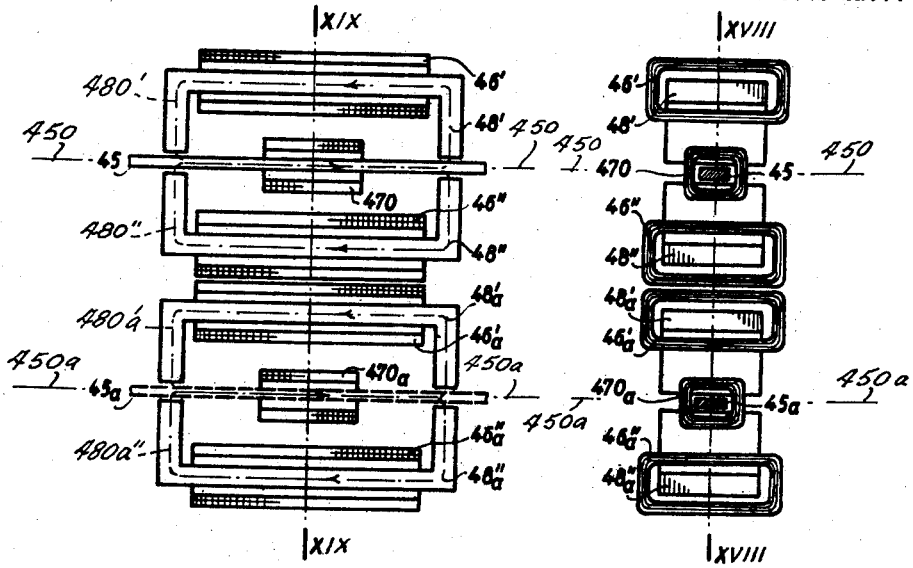
Fig. 18 illustrates a longitudinal sectional view of a still further embodiment taken along the line XVIII—XVIII of Fig. 19.
Fig. 19 represents a cross-sectional view taken along the line XIX—XIX of Fig. 18.
Figure 20:
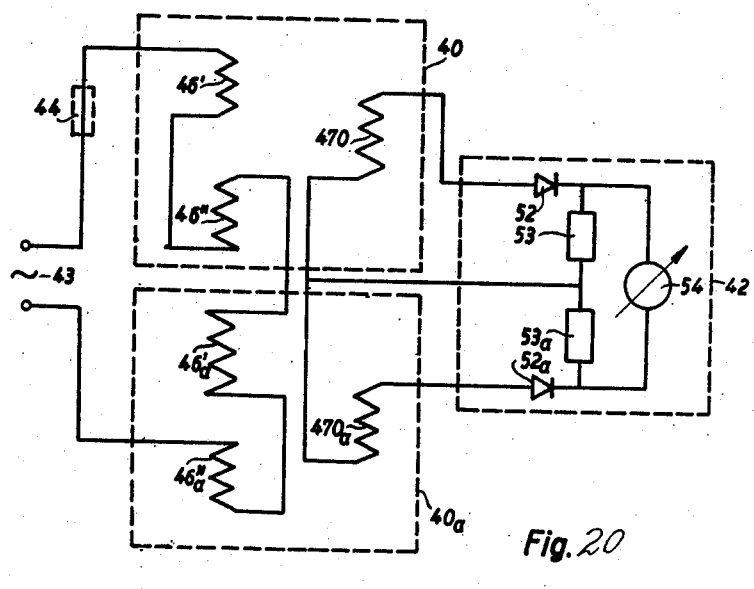
Fig. 20 shows the circuit diagram of the embodiment illustrated in Figs. 18 and 19.

An embodiment with a reference piece is illustrated in Figs. 18 to 20. This embodiment differs from that shown in Figs. 1 to 3 principally in that it is provided with an individual measuring coil 470, furthermore the magnetizing coil means portions 46' and 46" are arranged on the yoke means 48' and 48", respectively, and the measuring unit 40 has an electromagnetically equivalent counter-measuring unit 40a electrically connected to it in bucking relation in which a reference piece 45a of a cross-sectional area equal to the nominal or standard cross-sectional area of the test material 45 is accommodated. Various parts of the counter-measuring unit 40a corresponding to like parts of the measuring unit 40 are referred to by the same reference numerals completed by an index "a" as has been mentioned above in a general manner. The indicator means 42 of the present embodiment is formed so as to indicate cross-sectional diversities with respect to the reference piece 45a according to their positive or negative character, respectively.

Therefore, the electric signals derived from the measuring coil means 470 and 470a are rectified by rectifier means 52 and 52a and impressed upon loading resistors 53 and 53a, respectively. The difference of the voltage drops appearing on the loading resistors 53 and 53a and characteristic of the deviations from the standard cross-sectional area of the test material 45 can, according to its positive or negative character, be read on a D. C. indicator means 54 which is, with the represented embodiment, connected to the loading resistors 53 and 53a. Otherwise, this embodiment is also adapted for gauging the absolute values of cross-sectional areas if the reference piece 45a is removed from the counter-measuring unit 40a wherefore the latter is represented by dotted lines in Fig. 18.

In case of lower requirements as to the accuracy of measurement, or of determining minor deviations from the standard cross-sectional area, the electric signal characteristic of the latter may, instead of being derived from voltage fluctuations caused by the fluctuations of the flux, also be derived from the reaction of such voltage fluctuations on the magnetizing current, viz. from the fluctuations proper of the magnetizing current. Obviously, the magnetizing circuits of the measuring units 40 and 40a have then to be separated galvanically from one another.

Figure 21:
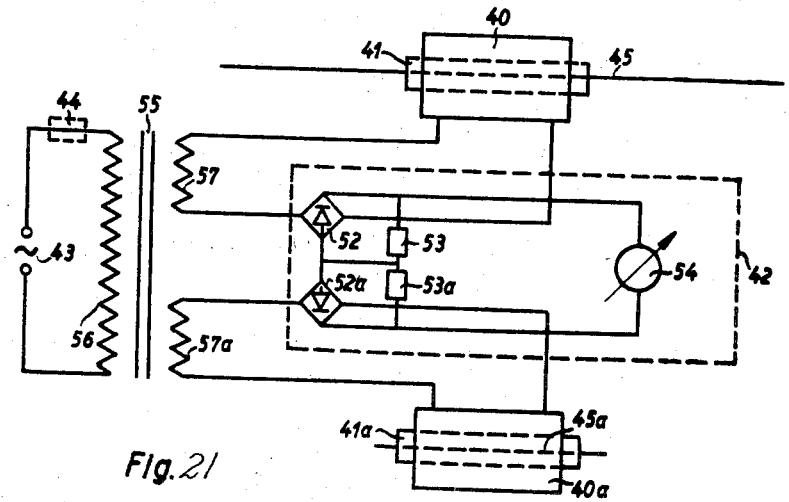
Fig. 21 is the circuit diagram of a still further embodiment.

Such an embodiment of the inventive apparatus is represented in Fig. 21. This embodiment is distinguished from that shown in Figs. 18 to 20 in that for sake of a galvanic separation of the magnetizing circuits the current source 43 comprises the primary winding 56 of a transformer 55 the galvanically separated secondary windings 57 and 57a of which are arranged so as to supply the measuring units 40 and 40a, respectively. At entirely symmetrical construction of the apparatus the electric characteristics of the windings 57 and 57a may be fully identic. With the represented embodiment double-way rectifying means, e. g. rectifiers 52 and 52a of the Graetz-circuit type, are used so as to warrant the continuity of the current in both half periods. The rectified electric signal appearing on the loading resistors 53 and 53a which is proportional to the current fluctuations, is inversely proportional to the cross-sectional diversities and of opposite sign with respect thereto. Because of the inversed proportionality the scale of the indicator means 54 must not be supposed to be linear but in the range of minor cross-sectional diversities.

When measuring average thickness values a plurality of measuring units 40 may be connected in series. If it is desired to associate but one counter-measuring unit 40a therewith, the secondary winding 57 supplying the measuring units 40 has to be sized so as to supply a proportionally increased voltage.

If a magnetizing current of constant frequency and constant maximum intensity is used, the instrument constituting a part of the indicator means 52 will be biased, i. e. the scale of the instrument adjusted so that the indicated value be zero whenever the gauging apparatus is void of test material 45. In case of the indicator means 42 being provided with an instrument of the rectifier type, its scale is linear and its deflection is proportional to the cross-sectional area and thickness, respectively, of the test material 45 provided that the requirement as to the zero position is met with.

The biasing of the instrument can be dispensed with if the above mentioned counter-measuring unit is made use of.

If the indicator means 42 has to be utilized for ascertaining diversities with respect to the standard cross-sectional area of the test material 45, a counter-measuring unit 40a comprising a reference piece 45a will be applied in the aforesaid manner. In such cases the electric signals coming from the measuring unit 40 and the counter-measuring unit 40a, respectively, will be individually rectified before supplying them to the indicator means 42 so as to obtain an indication which is correct as regards the sign thereof.

Figure 22:
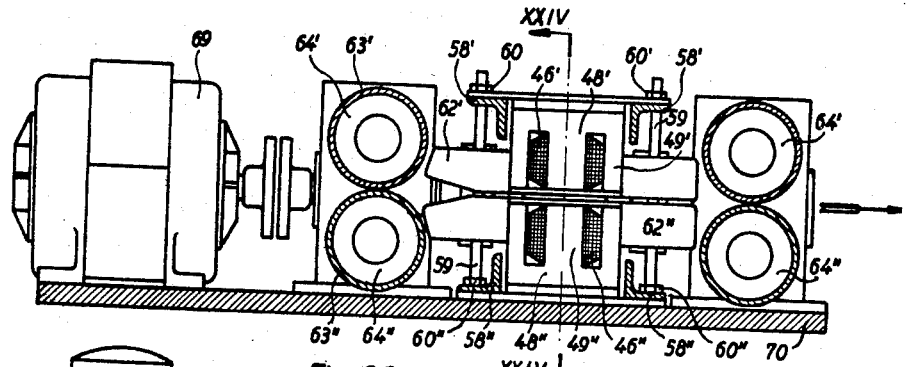
Fig. 22 illustrates a longitudinal sectional view of a still further embodiment taken along the line XXII—XXII of Fig. 23.
Figure 23:
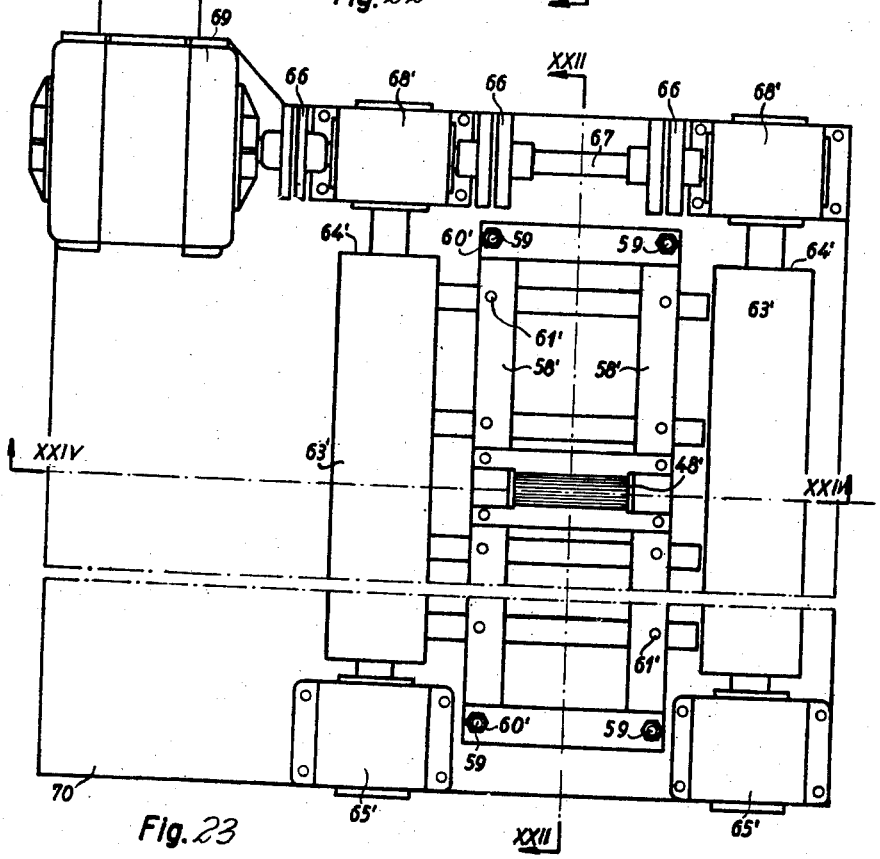
Fig. 23 represents the plain view of the embodiment shown in Fig. 22. Finally.

A practical realization of the inventive apparatus is shown in Figs. 22 to 24. This embodiment is, so far as the first electric or electromagnetic means is concerned, distinguished from the embodiment represented in Figs. 13 to 15 in that there are no lateral yoke means. Furthermore, it has no individual measuring coil means and thus the magnetizing coil means 46' and 46" form jointly the measuring coil portion 47 for deriving the electric signal. The yoke means 48' and 48" are inserted each between two transverse L-shaped girder members 58' and 58", respectively, their mutual vertical positions being secured by four threaded pillars 59 connected to the girder members 58' and 58" by means of nuts 60' and 60", respectively.

The path means referred to by reference numeral 41 with the previously described embodiments is constructed substantially as follows:

Referring to Fig. 24, the girder members 58' and 58" have skid-shaped guides 62' and 62" attached to them by means of studs 61' and 61", respectively. For sake of clarity, these studs 61' and 61" are not represented in Fig. 22. The guides 62' and 62" are destined, on one hand, to introduce the material to be gauged in between the yoke means 48' and 48" and, on the other hand, to prevent a contact between the material to be gauged and the leg portions 49' and 49" of the yoke means 48' and 48", respectively. Therefore, the sizes are selected so that the distance between the guides 62' and 62" is less than the distance between the leg portions 49' and 49" of the yoke means 48' and 48", respectively, as is particularly shown in Fig. 22.

For passing the test material pairs of rolls 64' and 64" coated with rubber layers 63' and 63", respectively, are arranged for conveyor means in front of and behind the guides 62' and 62". The rubber layers 63' and 63" serve for elastically compensating or taking up cross-sectional diversities of the test material. Instead or additionally, however, at least one of each pair of rolls might also be suspended on springs. Obviously, the pairs of rolls 66' and 66" as well as their drive means can be dispensed with if the material is passed anyway.

The pairs of rolls 64' and 64" are supported, on one hand, by means of bearings 65' and 65" and, on the other hand, by double-action worm gears 68' and 68", respectively, the latter being driven by means of a common spindle 67 subdivided by coupling 66. The spindle 67 is by means of the left extreme coupling 66 in Fig. 23 connected to the shaft of a driving motor 69 of the gauging apparatus.

The driving motor 69, the worm gears 68' and 68", the bearings 65' and 65" as well as the pillars 59 are all arranged on a common base frame 70. The apparatus has been represented discontinuously so as to indicate that, in case of gauging average thickness values of relatively broader materials, the measuring unit as represented can be associated with further units of like construction.

In operation, a field strength of a constant maximum value of about 300 oersteds will be established in the measuring unit 40 by means of the current source 43. This field strength induces a flux proportional thereto in the open magnetic circuit of the measuring unit 40. In order to compensate the electric signal resulting from the aforesaid magnetic flux either the instrument scale of the indicator means 42 will be adjusted to zero point or the signal will be compensated in the above described manner. Thereafter, the test material 45, e. g. transformer sheets of a standard thickness of 0.35 millimeter and of usual quality will be introduced into the path means 41. By the presence of the test material 45 the flux induced by the original magnetization will be increased by an amount proportional just to the cross-sectional area under test. The signal voltage resulting from such an increase of the flux appears now in the instrument of the indicator means 42 as a value characteristic of the thickness to be ascertained.

When making use of the previously described compensation principle a sheet of a thickness of accurately 0.35 millimeter will be accommodated as a reference piece 45a in the countermeasuring unit 40a, otherwise the reference piece being entirely of the same quality as the test material proper. Then the instrument of the indicator means 42 indicates deviations from the standard thickness, viz. a millimeter value according to its positive or negative sign by which the thickness of the transformer sheet 45 to be gauged surpasses or is short of the thickness of the reference piece 45a.

Gauging average thickness values by means of a plurality of suitably arranged measuring units 40 the latter may likewise be connected in series. If there is but one countermeasuring unit 40a to be associated with the aforesaid measuring units 40, the number of turns of the counter-measuring coil 470a will be selected so as to be increased proportionally to the applied number of measuring units 40.

With the previously described embodiments the travelling direction of the test material 45 has been parallel to the direction of the field generated by the measuring unit 40. In case of relatively broader materials the direction of the magnetizing force and the travelling direction may also be different from one another.

What I claim is:

1. In an apparatus for electromagnetically gauging cross-sectional areas of ferromagnetic materials, in combination, magnetizing coil means, path means for guiding the material to be gauged within said magnetizing coil means, electro-magnetic means adapted to set up a homogeneous alternating magnetic field within said magnetizing coil means so as to have a magnetic flux induced in and dependent on a cross-sectional area of said material, a pair of yoke means symmetrically arranged along said path means for conducting said magnetic flux so as to have said alternating magnetic field rendered homogeneous by means of confining it to a preselected spacial extension, electric means adapted to derive an electric signal characteristic of said cross-sectional area from the magnetic flux induced in said material, and indicator means for indicating said electric signal.

2. An apparatus as claimed in claim 1, wherein said magnetizing coil means is at least partly arranged on said pair of yoke means so as to increase the homogeneity of said alternating magnetic field.

3. In an apparatus for electromagnetically gauging cross-sectional areas of ferromagnetic materials, in combination, magnetizing coil means, path means for guiding the material to be gauged within said magnetizing coil means, electromagnetic means adapted to set up a homogeneous alternating magnetic field within said magnetizing coil means so as to have a magnetic flux induced in and dependent on a cross-sectional area of said material, a pair of main or first yoke means symmetrically arranged along said path means for conducting said magnetic flux so as to confine said alternating magnetic field to a preselected spacial extension, pairs of auxiliary or second yoke means symmetrically arranged on both sides of said main or first yoke means in a transverse direction with respect to the magnetic flux lines so as to increase the homogeneity of said alternating magnetic field in the gauging region of said magnetizing coil means, electric means electrically connected to said main or first yoke means and adapted to derive an electrical signal characteristic of said cross-sectional area from the magnetic flux induced in said material, and indicator means for indicating said electric signal.

4. In an apparatus for electromagnetically gauging cross-sectional areas of ferromagnetic materials, in combination, magnetizing coil means, path means for guiding the material to be gauged within said magnetizing coil means, electromagnetic means adapted to set up a homogeneous alternating magnetic field within said magnetizing coil means so as to have a magnetic flux induced in and dependent on a cross-sectional area of said material, a pair of yoke means provided with leg portions and symmetrically arranged along said path means for conducting said magnetic flux so as to confine said alternating magnetic field to a preselected spacial extension, said leg portions being provided with extensions for reducing the distance therebetween so as to increase the field strength of the homogeneous alternating magnetic field by reducing the length of the flux lines, electric means adapted to derive an electric signal characteristic of said cross-sectional area from the magnetic flux induced in said material, and indicator means for indicating said electric signal.

5. In an apparatus for electromagnetically gauging cross-sectional areas of ferromagnetic materials, in combination, magnetizing coil means comprising at least one pair of symmetrically arranged open magnetic circuits, path means for guiding the material to be gauged within said magnetizing coil means between said open magnetic circuits, a first or main measuring unit comprising electromagnetic means adapted to set up a homogeneous alternating magnetic field within said magnetizing coil means so as to have a magnetic flux induced in and dependent on a cross-sectional area of said material, and electric means adapted to derive an electric signal characteristic of said cross-sectional area from the magnetic flux induced in said material, a second or counter-measuring unit electrically connected to said first or main measuring unit, both units being electromagnetically equivalent and mutually opposite so as to compensate magnetic fluxes independent of said material, and indicator means for indicating said electric signal.

6. An apparatus as claimed in claim 5 wherein said counter-measuring unit comprises counter-magnetizing coil means, counter-path means being provided for guiding a test piece consisting of the material to be gauged and having a nominal cross-sectional area thereof within said counter-magnetizing coil means so as to additionally compensate magnetic fluxes induced in said material within said first or main measuring unit proportionally to its nominal cross-sectional area.

7. In an apparatus for electromagnetically gauging cross-sectional areas of ferromagnetic materials, in combination, magnetizing coil means comprising at least one pair of symmetrically arranged open magnetic circuits, path means for guiding the material to be gauged within said magnetizing coil means between said open magnetic circuits, electromagnetic means adapted to set up a homogeneous alternating magnetic field within said magnetizing coil means so as to have a magnetic flux induced in and dependent on a cross-sectional area of said material, electric means adapted to derive an electric signal characteristic of said cross-sectional area from the magnetic flux induced in said material, and indicator means adapted to indicate said electric signal and formed by a measuring instrument provided with rectifier means.

8. In an electromagnetic apparatus for non-destructive gauging cross-sectional areas of ferromagnetic materials, a measuring unit comprising at least one pair of open magnetic circuits arranged symmetrically with respect to a common reference plane facing their open portions, path means for passing a ferromagnetic material to be gauged as test material along said common reference plane so as to occupy positions wherein it is adapted to conduct magnetic fluxes energized in said open magnetic circuits across the open portions thereof, first electric means for producing mutually opposed alternating magnetic fluxes in said open magnetic circuits of sufficient value substantially to saturate said test material, and second electric means responsive to variations in the magnitude of said alternating magnetic fluxes due to variations in the cross-sectional areas of said test material.

9. In an electromagnetic apparatus for non-destructive gauging cross-sectional areas of ferromagnetic materials, a measuring unit comprising at least one pair of open magnetic circuits including magnetic material and arranged symmetrically with respect to a common reference plane facing their open portions, path means for passing a ferromagnetic material to be gauged as test material along said common reference plane so as to occupy positions wherein it is adapted to conduct fluxes energized in said open magnetic circuits across the open portions thereof, first electric means for energizing mutually opposed alternating magnetic fluxes in said open magnetic circuits of sufficient value substantially to saturate said test material and consisting of at least a system of magnetizing coil means arranged along said open magnetic circuits at least partly on said magnetic material, and second electric means responsive to variations in the magnitude of said alternating magnetic fluxes due to variations in the cross-sectional areas of said test material and consisting of at least one measuring coil means arranged along said open magnetic circuits, and of an indicator means connected across said measuring coil means for receiving an electric signal therefrom in response to the alternating magnetic flux surrounded thereby.

10. An electromagnetic apparatus as claimed in claim 9, wherein said measuring coil means is galvanically separated from said system of magnetizing coil means.

11. In an electromagnetic apparatus for non-destructive gauging cross-sectional areas of elongated ferromagnetic materials, a measuring unit comprising at least one pair of open magnetic circuits arranged symmetrically with respect to a common reference plane facing their open portions, magnetic material included in said open magnetic circuits in the form of U-shaped bodies, extensions on the legs of said U-shaped bodies arranged along said common reference plane for reducing the length of said open portions of said open magnetic circuits, path means for passing a ferromagnetic material to be gauged as test material along said common reference plane so as to occupy positions wherein it is adapted to conduct a flux energized in said open magnetic circuits across the open portions thereof, first electric means for energizing mutually opposed alternating magnetic fluxes in said open magnetic circuits of sufficient value substantially to saturate said test material and consisting of at least a system of magnetizing coil means arranged along said open magnetic circuits at least partly on said U-shaped magnetic bodies, and second electric means responsive to variations in the magnitude of said alternating magnetic fluxes due to variations in the cross-sectional areas of said test material and consisting of a measuring coil means arranged along said common reference plane between said extensions so as to surround said test material when passed along said common reference plane, and of an indicator means connected across said measuring coil means for receiving an electric signal therefrom in response to the alternating magnetic flux surrounded thereby.

12. In an electromagnetic apparatus for non-destructive gauging the thickness of ferromagnetic sheet or strip materials, a measuring unit comprising one pair of main or first open magnetic circuits arranged symmetrically with respect to a common reference plane facing their open portions, pairs of auxiliary or second open magnetic circuits arranged on both sides of and in parallel with said main or first open magnetic circuits symmetrically with respect to said common reference plane, path means for passing a ferromagnetic sheet or strip material to be gauged as test material along said common reference plane so as to occupy positions wherein it is adapted to conduct flux energized in said open magnetic circuits across the open portions thereof, first electric means for energizing mutually opposed alternating magnetic fluxes in said symmetrically arranged open magnetic circuits of sufficient value substantially to saturate said test material and consisting of at least a system of magnetizing coil means arranged along said open magnetic circuits, and second electric means responsive to variations in the magnitude of said alternating magnetic fluxes due to variations in the thickness of said test material and consisting of a system of measuring coil means arranged along said main or first open magnetic circuits, and of an indicator means connected across said system of measuring coil means for receiving an electric signal therefrom in response to the alternating magnetic fluxes surrounded thereby.

13. In an electromagnetic apparatus for non-destructive gauging cross-sectional areas of ferromagnetic materials, a first measuring unit comprising at least one pair of open magnetic circuits arranged symmetrically with respect to a common reference plane facing their open portions, path means for passing a ferromagnetic material to be gauged as test material along said common reference plane so as to occupy positions wherein it is adapted to conduct fluxes energized in said open magnetic circuits across the open portions thereof, first electric means for producing mutually opposed alternating magnetic fluxes in said open magnetic circuits of sufficient value substantially to saturate said test material, and second electric means responsive to variations in the magnitude of said alternating magnetic fluxes due to variations in the cross-sectional areas of said test materials, a second measuring unit electromagnetically equivalent and oppositely connected to said first measuring unit so as to compensate magnetic fluxes independent of said test material, and an indicator means connected across said first and said second measuring units for receiving an electric signal from said second electric means in response to the alternating magnetic flux in said test material.

14. In an electromagnetic apparatus for non-destructive gauging cross-sectional areas of ferromagnetic materials, a first measuring unit comprising at least one pair of open magnetic circuits arranged symmetrically with respect to a common reference plane facing their open portions, first path means for passing a ferromagnetic material to be gauged as test material along said common reference plane so as to occupy positions wherein it is adapted to conduct fluxes energized in said open magnetic circuits across the open portions thereof, first electric means for energizing mutually opposed alternating magnetic fluxes in said open magnetic circuits of sufficient value substantially to saturate said test material and consisting of at least a system of magnetizing coil means arranged along said open magnetic circuits, and second electric means responsive to variations in the magnitude of said alternating magnetic fluxes due to variations in the cross-sectional areas of said test material and comprising at least one measuring coil means arranged along said open magnetic circuits and galvanically separated from said magnetizing coil means, a second measuring unit comprising magnetizing coil means and measuring coil means electromagnetically equivalent and oppositely connected to said magnetizing coil means and to said measuring coil means, respectively, of said first measuring unit so as to compensate magnetic fluxes independent of said test materials, and second path means in said second measuring unit for positioning a reference piece made of said test material and having a standard cross-sectional area so as to additionally compensate magnetic fluxes energized in said test material in proportion to its standard cross-sectional area, and indicator means connected across said first and said second measuring coil means for receiving electric signals therefrom in response to the net alternating magnetic flux proportional to deviations of the closs-sectional areas of said test material from said standard value when said reference piece is accommodated in said second path means.

15. An electromagnetic apparatus as claimed in claim 14, wherein said indicator means comprises a pair of rectifier means each member of which is associated with one of said measuring coil means, and a D. C. measuring instrument so as to receive rectified electric signals from each of said measuring coil means and to indicate a difference signal according to its positive or negative sign.

References Cited in the file of this patent
UNITED STATES PATENTS

| | | |
|---|---|---|
| 2,226,275 | Abbott et al. | Dec. 24, 1940 |
| 2,357,666 | Kuehni | Sept. 5, 1944 |
| 2,455,792 | Meunier | Dec. 7, 1948 |